3,390,119
HYDROCARBON OIL-URETHANE COMPOSITIONS
Stephen H. Alexander, St. Louis, Mo., Stewart R. Montgomery, Silver Spring, Md., and Leo J. Spillane, Chesterfield, Mo., assignors to Monsanto Company, a corporation of Delaware
No Drawing. Filed Dec. 4, 1963, Ser. No. 328,115
5 Claims. (Cl. 260—33.6)

ABSTRACT OF THE DISCLOSURE

The present invention relates to a new and novel composition having particular utility as a coating or molding compound. More particularly, the present invention relates to a composition having particular utility as a coating or molding compound comprised of a particular petroleum derived oil and urethane polymers.

The use of urethane polymers as coating and molding compositions is well known. Within recent years, the coating and molding characteristics of urethane polymers have given rise to a host of commercial applications such as in coatings on metallic surfaces and on other such substrates as paper, leather, textiles, etc. However, the cost of producing urethane polymer coating and molding compositions is prohibitive of many end uses. As in any other situation where a relatively expensive material is in use, there is a constant search for methods of producing the material more economically or for less expensive materials possessing the same or similar properties.

It is an object of the present invention to provide new and novel compositions and a method for their preparation which compositions are useful as coating and molding compounds. Yet another object of the present invention is to provide new and useful compositions comprised of a particular petroleum derived oil and a urethane polymer. It is also an object of the present invention to provide a method for preparing a new and useful composition comprised of a particular petroleum derived oil and urethane polymers. Yet another object of the present invention is to provide a composition comprised of a particular petroleum derived oil and urethane polymers which will set at ambient temperatures as well as at elevated temperatures. Also, it is an object of the present invention to provide a method of preparation for a composition comprised of a particular petroleum derived oil and urethane polymers which will set at ambient temperatures as well as at elevated temperatures. Other objects of the present invention are to provide new and novel compositions and methods for their preparation comprised of particular petroleum derived oils and urethane polymers which compositions are useful as coating materials and as molding materials. Additional objects will become apparent from the following description of the invention herein disclosed.

In fulfillment of these and other objects, it has been found that the composition comprised of a petroleum derived oil having a boiling range within the temperature range of 230 to 580° C., and a urethane provides a material which has excellent properties as a coating and molding composition. The petroleum derived oil generally will be aromatic and/or naphthenic in character. The method whereby the novel compositions of the present invention are prepared comprises intimately mixing a petroleum derived oil having a boiling range within the temperature range of 230 to 580° C. with a urethane polymer or urethane pre-polymer and a polymer forming agent for the pre-polymer. In the use of urethane pre-polymers and a polymer forming agent, the urethane pre-polymers are polymerized in situ in the petroleum derived oil. An added advantage inherent in the present invention is that the compositions prepared according to the present invention have been found to cure at ambient temperatures (20 to 40° C.) as well as at elevated temperatures.

The term "urethane" is used herein in a broad generic sense to include the well known classes of monomeric materials which contain at least one urethane linkage. The term is intended to include compositions which may also contain other types of linkages, such as vinyl-modified urethanes and polyester-modified urethanes. The urethanes of this invention may be self-curing or may be cured by means of other modifiers such as tertiary amines, inorganic acids, e.g., sulfuric acid and phosphoric acid, metallic carbonyl compounds, e.g., nickel carbonyl compounds and phosphines, etc. The preferred urethanes of this invention are the well known polyurethanes which contain at least one urethane linkage.

The urethanes of this invention include polyurethanes which include polyisocyanates and polyisocyanates containing other active groups, polyesters and modified polyesters. These preferred urethanes also include adducts of polyisocyanates with other materials having reactive components such as castor oil, linseed oil, soya oil and the like, polyols obtained by polymerizing compounds containing ethylene oxide groups, polyesters containing hydroxyl groups (obtained by condensing aromatic and/or aliphatic glycols with aromatic and/or aliphatic carboxylic acids, etc.).

The term "urethane" also includes the well-known polisocyanate modifications of polyesters, polyester amides, polyisocyanate modified polyester amides, polyisocyanate modified alkylene glycols, etc. The term further includes isocyanates condensed with hydroxy compounds such as allyl alcohol and the like, wherein the polymer structure comprises linear and/or cross-linked hydrocarbon groups formed by reactions in addition to the urethane reaction.

The preferred urethanes for use in this invention are those polymeric or monomeric organic compounds which contain one or more urethane linkages. These urethane linkages need not necessarily be formed during a polymerization reaction but may be present in the molecule either before polymerization or formed subsequent to a polymerization reaction. The preferred urethanes are those which may be produced by the well known reaction between organic isocyanates or polyisocyanates and mono-functional or poly-functional hydroxy compounds. It is further preferred that the urethanes be prepared from polymeric polyisocynates containing urethane linkages that may be obtained by reacting an excess of a monomeric polyisocyanate with a monomeric or polymeric poly-functional hydroxy compound, although monomeric polyisocyanates are equally applicable. It is still further preferred that polymeric poly-fuctional hydroxy compounds be employed, although monomeric poly-functional hydroxy compounds may be employed with equal facility.

A particularly useful class of polyurethanes is described in "Official Digest—Federation of Paint and Varnish Production Clubs," vol. 30, No. 396, pp. 37–48, 1958. Another useful class of polyurethanes is described in "Urethane Coatings," Second Edition, Mobay Chemical Company. Still another class of useful polyurethanes is described in "Some Aspects of Polyurethane Chemistry" by H. Gudgeon and R. J. W. Reynolds, pp. 677–693, Journal of the Oil and Colour Chemists Association, vol. 42, 1959. Other suitable urethane and urethane-containing compositions are described in the following U.S. Patents: 2,652,531, 2,888,432, 2,888,413, 2,888,409, 2,888,408, 2,888,412, 2,844,544, 2,763,628, 2,850,474, 2,760,953, 2,729,618. Particularly useful urethane prepolymer compositions are described in U.S. Patent 2,879,233. A class of polyurethane resins cross-linked with polythio ethers and vinylidene is described in U.S. Patents 2,879,250 and 2,879,248.

If desired, foamed compositions may be prepared by means of any of the well-known systems. Foams may be produced by mechanical agitation, by physical blowing with decomposition products or nonassociated chemicals, or by chemical reaction between the reactive groups of the urethanes and other reactive materials. The physical foaming may be created by the release of compressed gases such as air, nitrogen, etc., just prior to gelling of the composition or by incorporating into the mixture decomposable chemicals such as sodium carbonate, dinitrosopentamethylene tetramine, inorganic and organic peroxides, etc. A preferred method of foaming is the incorporation into the compositions of this invention of various chemicals having reactive groups such as hydroxyls, e.g., water, acids, hydrated salts, etc. and other chemicals having acidic active hydrogen. A particularly useful foaming system is described in U.S. Patent 2,740,-743. Chemical foaming of this nature can be controlled by control of the reactive groups present such as hydrogen and hydroxyl radicals. Other controlled foaming systems are described in U.S. Patents 2,729,618, 2,888,412, 2,906,717, 2,894,191, 2,888,409, 2,888,408, 2,888,413, British Patent No. 806,483, etc.

The compositions of this invention may be further modified by the addition of any of the well known fillers such as diatomaceous earth, silica gels, mica, slate flour, carbon black, metallic salts such as magnesium stearate, metallic powders, such as aluminum pigment, china clay, milled and fibrous asbestos, vermiculite, etc. may be added to the compositions of this invention. The proportions of filler to petroleum derived oil will vary considerably depending upon the final use for the product. It is customary for the filler, if any, to be added in an amount ranging from 5 to 35 percent by weight based on the total weight of composition.

The petroleum derived oil used in the novel compositions of the present invention may be either aromatic or naphthenic oil or a combination aromatic-naphthenic oil. These oils will generally boil within the range of 230° to 580° C., but somewhat more preferably within the range of 260 to 550° C. For the purposes of the present invention, an aromatic oil is defined as one in which at least 55 percent of the carbon atoms occur in benzene or condensed benzene ring structures. A naphthenic oil for the purpose of the present invention is one containing less than 55 percent by weight of aromatics and more than 60 percent by weight combined aromatics and naphthenes, but no less than 35 percent by weight of naphthenes. Such oils as these contemplated herein may be obtained from petroleum refinery streams by the solvent extraction or distillation of heavy catalytic cycle oils, light catalytic cycle oils, lube oils, gas oils, thermally cracked residues, etc. The light catalytic cycle oils represent a heavy material somewhat comparable in molecular weight to diesel fuel streams and is the fraction produced by catalytic cracking which is immediately below the heavy catalytic cycle oil in boiling point. Regardless of the method whereby the aromatic or naphthenic oils are obtained, it will be generally preferred that they have the following physical properties:

Boiling range of 260–550° C. at 760 mm. Hg
Specific gravity of 0.93 to 1.11 at 60/60° F.
Refractive Index of 1.50 to 1.68 at 20° C.

The useful materials of this invention generally are comprised of from approximately 10 to about 90 percent by weight of the petroleum derived oil and from about 90 to 10 percent by weight of a urethane polymer. However, for most applications, the preferred compositions are those comprised of from about 10 to about 50 percent by weight of petroleum derived oil and about 90 to about 50 percent by weight of urethane polymer. The most useful compositions of the present invention are comprised of approximately from 20 to 40 percent by weight of the petroleum derived oil and 80 to 60 percent by weight of a urethane polymer.

The method of preparing the composition of the present invention comprises intimately mixing the petroleum derived oil and a urethane polymer or urethane polymer-forming materials. Generally this will be carried out by co-mingling the petroleum derived oil and urethane polymer or polymer-forming materials and then allowing the reaction mass to set (cure). The mixing of these components may be carried out at virtually any temperature though generally ambient temperatures (20–40° C.) are preferred from a practical standpoint, however, elevated temperatures may be used. The curing of the petroleum derived oil-urethane polymer compositions is carried out at temperatures ranging from ambient temperatures up to and including temperatures as high as 125° C. and higher. Generally the higher the temperature, the more rapid is the curing.

In order to illustrate and more fully describe the present invention, the following examples are presented. It is to be understood, of course, that these examples are in no way to be construed as limiting to the present invention.

EXAMPLE I

Part A

| Components: | Weight grams |
|---|---|
| Urethane prepolymer A [1] | 10 |
| A furfural extract of a petroleum refinery heavy catalytic cycle oil having the following properties: Sp. Gr. (60° F./60° F.), 1.07; Boiling range, 95–260° C. at 2 mm. Hg; refractive index (20° C.), 1.64. (This oil was mainly aromatic) | 10 |

Part B

| | |
|---|---|
| Castor oil polyol [2] | 10 |

[1] Urethane prepolymer A obtained from Baker Castor Oil Co. and known commercially as Polycin U-75 is prepared by reacting an excess of tolylene diisocyanate (80/20 type) with a polymerized castor oil. It has the following physical properties: Viscosity at 25° C., 5 poises; Density at 25° C., 9.2 lb./gal.; —NCO content, 13.7 percent; Equivalent weight por —NCO group, 306.
[2] This is a polymerized castor oil obtained from Baker Castor Oil and is known commercially as Polycin 57 and is obtained by blowing air through the material at moderate temperatures. This polymerized castor oil has the following properties: Hydroxyl Number, 151; Isocyanate Eq. wt., 346; Acid value, 11; Estimated molecular weight, 1040; Density at 25° C., 0.980 g./cm.³; Viscosity at 25° C., 3,000 centipoises.

Procedure.—The components comprising Part A were mixed together by stirring at room temperature. Part A was thoroughly mixed with Part B with vigorous stirring. The plastic coating material was spread out on an aluminum sheet and cured in an oven at 50–60° C. for one hour. A flexible, light-yellow colored coating was produced. This coating (approximately 40 mils thick) showed good solvent resistance toward petroleum naphtha.

EXAMPLE II

Part A

| Components: | Weight grams |
|---|---|
| Urethane prepolymer B [3] | 5 |
| A deasphalted gas oil having the following properties: Gravity, API, 21; Sulfur, wt. percent 1.3; Refractive index (20° C.); 1.52–1.53; Boiling range of 900 to 1050° F. at 1 atm. (This oil was mainly naphthenic.) | 5 |

Part B

Castor Oil Polyol [4]

[3] This urethane prepolymer was obtained from Mobay Chemical Co. and is known commercially as Mondur CB–75 and was prepared by reacting three moles of tolylene diisocyanate (80/20 type) with trimethylolpropane. It has the following physical properties: Solids content, 75 percent; Solvent, ethyl acetate; —NCO content, 13.5 percent; Viscosity at 25° C., 2100–4100 cps.; Flash point (Tag open cup, Approx. 40° F.

[4] See footnote 2.

The components were mixed as in Example I and cured at room temperature (77° F.) for 18 hours to give a flexible, brown colored solid.

EXAMPLE III

Part A

| Components: | Weight grams |
|---|---|
| Urethane prepolymer B [5] | 10 |
| A select cut of a furfural extract of a heavy petroleum lube oil having the following properties: Boiling range 187–208° C. at 10 mm. Hg; Specific gravity, 1.04 (60° F.); Refractive index (20° C.), 1.625. (This oil was mainly aromatic.) | 8 |

[5] See footnote 3.

Part B

| Components: | Weight grams |
|---|---|
| Castor oil polyol [6] | 10 |

[6] See footnote 2.

This mixture was prepared as in Example I and separated into two portions one portion of which was cured for 8 hours at 190° F. Under these conditions a light yellow, flexible solid was obtained. The other portion was cured at room temperature for approximately 24 hours. The resulting clear yellow-colored coating was flexible.

EXAMPLE IV

Part A

| Components: | Weight grams |
|---|---|
| Urethane prepolymer C [7] | 20 |
| A select cut of a furfural extract of a heavy petroleum lube oil having the following properties: Boiling range 187–208° C. at 10 mm. Hg.; Specific gravity, 1.04 (60° F./60° F.); Refractive index (20° C.) 1.625. (This oil was mainly aromatic.) | 10 |
| Santocel FRC, an aero silica gel (Monsanto Chemical Co.) | 0.5 |

[7] Urethane Prepolymer C is a urethane prepolymer obtained from Thiokol Chemical Co., known commercially as Rigithane C–112, which is prepared by reacting an excess of tolylene diisocyanate (80/20 type) with a linear polyester prepared from a dibasic acid and a dihydroxy compound. Rigithane C–112 has the following properties: Specific gravity at 25° C., 1.12; —NCO content, 14.7 percent; Viscosity at 80° F., 125 poises.

Part B

| Components: | Weight grams |
|---|---|
| Catalyst for urethane prepolymer C [8] | 2.4 |

[8] A mixture of an amine and a foaming agent.

The components were mixed as in Example I and cured to a rigid, light tan colored foam in 1–2 hours at 75° F. It did not exude any of its oily component and was practically odorless.

EXAMPLE V

Part A

| Components: | Weight grams |
|---|---|
| Urethane prepolymer D [9] | 5 |
| A high boiling fraction obtained by the distillation of a thermally cracked petroleum based tar having the following properties: Specific gravity (25° C./25° C.), 1.07; Refractive index (20° C.), 1.64; Sulfur, weight percent, 0.2; Boiling range 285–360° C. at 760 mm. Hg. (This oil was mainly aromatic) | 5 |

[9] Urethane Prepolymer D is a urethane prepolymer obtained from Baker Castor Oil Co., known commercially as Polycin U–63, and prepared by reacting an excess of toluene diisocyanate (80/20 type) with a polymerized castor oil. Polycin U–63 has the following physical properties: Viscosity at 25° C., 400 Centipoises; Density at 25° C., 9.12 lb./gal.; —NCO content, 13.6 percent; Equivalent weight percent —NCO group, 308.

Part B

| Components: | Weight grams |
|---|---|
| Castor oil polyol [10] | 5 |

[10] See footnote 2.

The components were mixed as in Example I and cured at 175° C. for 18 hours. The dark brown coating (approximately 60 mils thick) was quite flexible.

The above examples clearly demonstrate the variety of desirable properties which may be found in the compositions of the present invention. Also, the wide range of curing temperatures usable in the preparation of these compositions are well illustrated by the above examples.

What is claimed is:

1. A non-cellular coating composition comprised of 20 to 40 percent by weight of a petroleum derived oil having a boiling range within the temperature range of 230 to 580° C., a specific gravity of 0.93 to 1.11 at 60/60° F., and a refractive index of 1.50 to 1.68 at 20° C., and from about 80 to about 60 percent by weight of a polyurethane polymer prepared by reaction of an organic polyisocyanate and a polyfunctional hydroxy compound, said petroleum derived oil being one selected from the group consisting of (A) an aromatic oil in which at least 55% of the carbon atoms occur in benzene or condensed benzene ring structures, (B) a naphthenic oil containing less than 55% by weight of aromatics and more than 60% by weight combined aromatics and naphthenes, but no less than 35% by weight of naphthenes, and (C) combinations of (A) and (B).

2. The composition of claim 1 wherein the petroleum derived oil is said aromatic oil.

3. The composition of claim 1 wherein the petroleum derived oil is said naphthenic oil.

4. The composition of claim 1 wherein the petroleum derived oil is one having a boiling range within the temperature range of 260 to 550° C.

5. The composition of claim 1 wherein an inert filler is included.

References Cited

UNITED STATES PATENTS

| 3,143,517 | 8/1964 | Heiss | 260—33.6 |
| 3,190,842 | 6/1965 | Ringwood et al. | 260—2.5 |
| 3,314,903 | 4/1967 | Belak et al. | 260—2.5 |

FOREIGN PATENTS

| 850,162 | 9/1960 | Great Britain. |

DONALD E. CZAJA, *Primary Examiner.*

LEON J. BERCOVITZ, *Examiner.*

G. W. RAUCHFUSS, Jr., H. S. COCKERAM,
*Assistant Examiners.*